G. H. SMITH, DEC'D.
N. E. SMITH, ADMINISTRATRIX.
HOT BLAST STOVE.
APPLICATION FILED JULY 10, 1913.

1,114,403.

Patented Oct. 20, 1914.
5 SHEETS—SHEET 1.

WITNESSES

INVENTOR
George H. Smith, Dec'd.,
Nellie E. Smith, Administratrix

UNITED STATES PATENT OFFICE.

GEORGE H. SMITH, DECEASED, LATE OF ASPINWALL, PENNSYLVANIA, BY NELLIE E. SMITH, ADMINISTRATRIX, OF ASPINWALL, PENNSYLVANIA.

HOT-BLAST STOVE.

1,114,403.  Specification of Letters Patent.  Patented Oct. 20, 1914.

Application filed July 10, 1913. Serial No. 778,393.

*To all whom it may concern:*

Be it known that GEORGE H. SMITH, deceased, late a citizen of the United States residing at Aspinwall, in the county of Allegheny and State of Pennsylvania, did invent certain new and useful Improvements in Hot-Blast Stoves, of which the following is a specification.

The invention has relation to the construction of regenerative hot-blast stoves employed in heating the air-blast used in blast-furnaces and more particularly to the construction and arrangement of the refractory lining and checker-work of such hot-blast stoves. In such hot-blast stoves the refractory material forming the checkerwork and lining is alternately heated and cooled and after being gradually heated to a high temperature becomes slowly cooled to between 800 and 1200 degrees Fahrenheit by the action of the cold-blast passed through the stove, the cold-blast absorbing heat and becoming heated to between 800 and 1200 degrees Fahrenheit from the highly heated checker-work and lining in passing through the stove and after becoming heated to the desired high temperature the heated air or hot-blast is led through the hot-blast main into the blast-furnace. With such hot-blast stoves the alternate expansion and contraction of the refractory lining and the checkerwork caused by the alternate heating and cooling thereof together with the enormous weight of the refractory materials forming the lining and checkerwork makes it difficult if not impossible to prevent or avoid crushing and crumbling thereof. The weight of the refractory checkerwork and crushing strength of the checkerwork has been a factor limiting the economical height to which the stoves can be built, as the lining and checkers have always been supported or carried from the bottom of the stove. As the diameter or cross section of the stove compared with the height is relatively small and as all of the checkerwork must be removed to enable the bottom series of courses of the checkerwork to be removed, the time required in relining or repairing the checkerwork causes a long delay and serious interruption in the operation of the stoves when such relining or repairing operations become necessary.

One object of the invention is to provide a hot-blast stove of improved construction having novel means whereby the capacity and efficiency of the stove are materially increased.

Another object of the invention is to provide a stove construction having novel means whereby the heating surface of the stove is greatly increased and the flow of the air-blast through the stove is equalized and more uniformly distributed.

A further object of the invention is to provide a stove having a refractory lining and checkerwork of novel construction and having improved means whereby the checkerwork is supported in the stove and the weight of the refractory materials forming the checkerwork is distributed within the stove shell.

A still further object of this invention is to provide a hot-blast stove having improved means whereby the necessity of entirely removing the lining and checkerwork from the stove in renewing and repairing the lining or checkerwork is avoided and the time required to reline the stoves is greatly lessened and the cost of maintaining the stoves in operative condition is materially reduced.

Still further objects of the invention will become apparent as the invention is hereinafter more fully described and claimed.

Referring to the accompanying drawings forming part of this specification.

Figures 1, 2, 3:
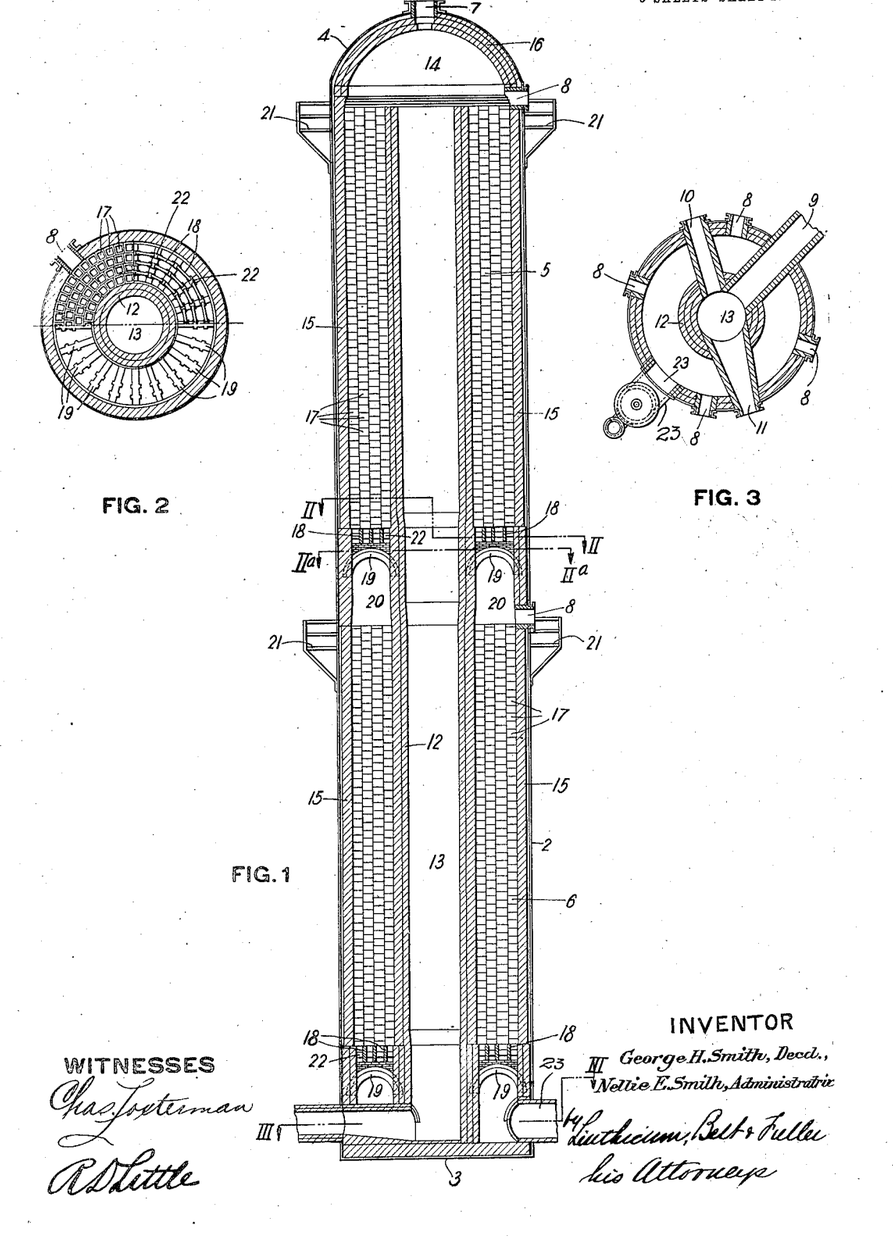
Figure 1 is a vertical section of a two-pass hot-blast stove having a central combustion chamber and having a refractory lining and checkerwork therein constructed and arranged in accordance with the invention.
Fig. 2 is a sectional plan showing the construction and arrangement of the checkers, the checker supporting girder tiles and the radial tile supporting arches used in this type of stove in accordance with and forming part of the invention, the upper half of the section being taken on the irregular line II—II, and the lower half of the section being taken on the line II$^a$—II$^a$ of Fig. 1.
Fig. 3 is a sectional plan taken on the line III—III of Fig. 1, showing the arrangement and relative location of the air and gas inlet and gas outlet connections to the stove.
Figures 4, 6, 9:
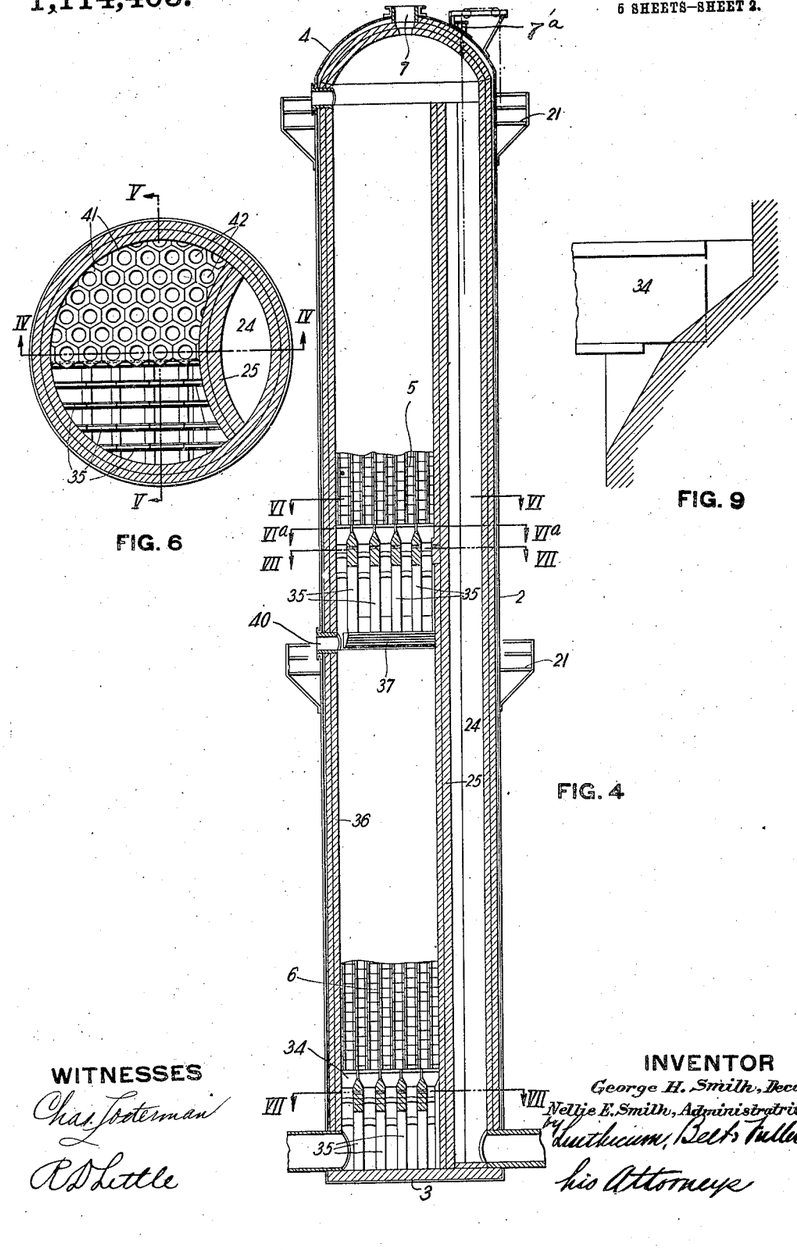
Fig. 4 is a vertical section of a two-pass hot-blast stove having a side combustion chamber and having a lining and checkerwork erected therein in accordance with this invention, the section being taken on the line IV—IV of Fig. 6.
Fig. 6 is a sectional plan, the upper half of the figure showing the arrangement of the checkers being taken on the line VI—VI and the lower half showing the girder tiles on the line VI<sup>a</sup>—VI<sup>a</sup> of Fig. 4.
Fig. 9 is a sectional elevation showing in detail the manner of supporting the girder tiles upon the stove shell lining.
Figures 5, 7, 8:
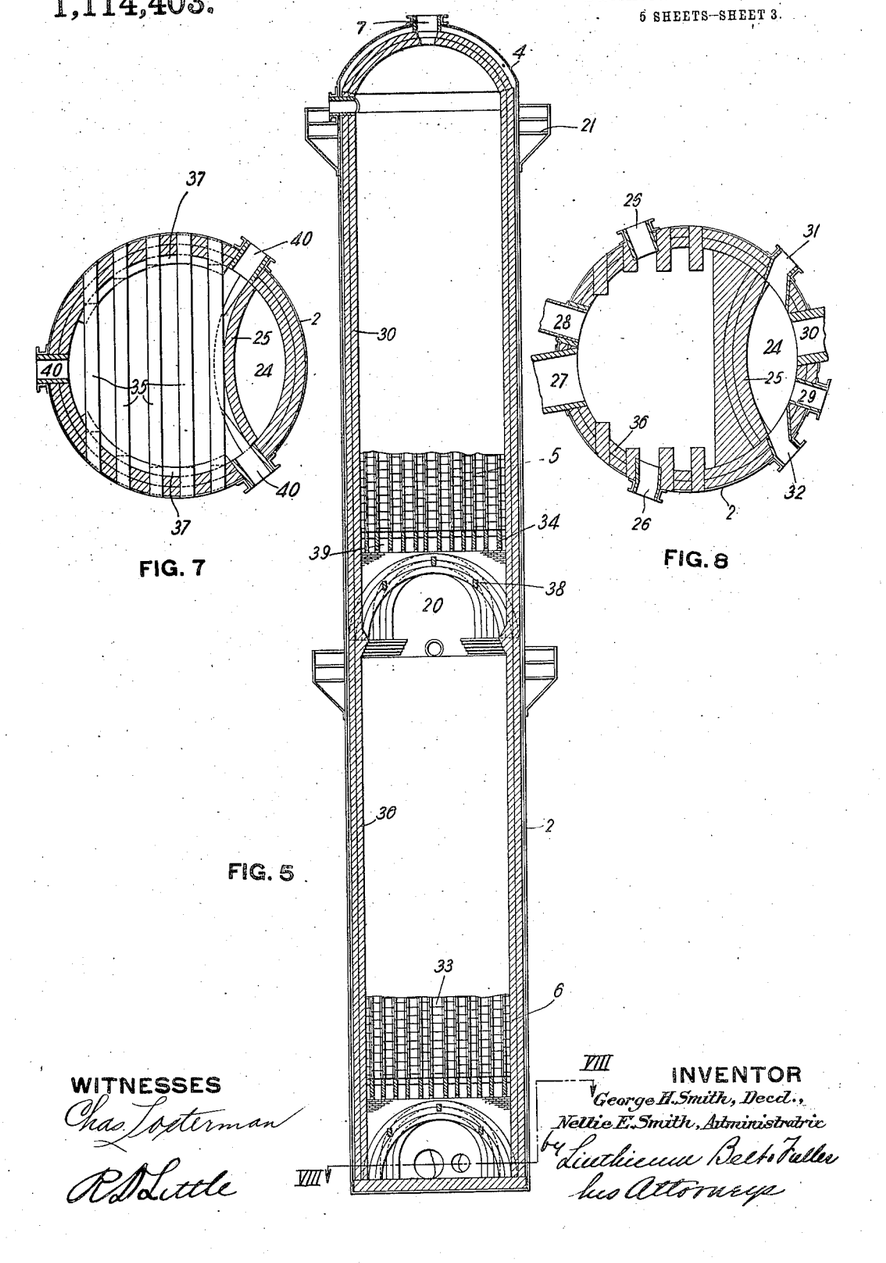
Fig. 5 is a vertical section of the stove construction shown in Fig. 4, the section being taken on the irregular line V—V of Fig. 6.
Fig. 7 is a similar sectional plan taken on the line VII—VII or line VII<sup>a</sup>—VII<sup>a</sup> of Fig. 4 showing the arrangement of the girder tile supporting arches.
Fig. 8 is a sectional plan taken on the line VIII—VIII of Fig. 5.
Figure 10:
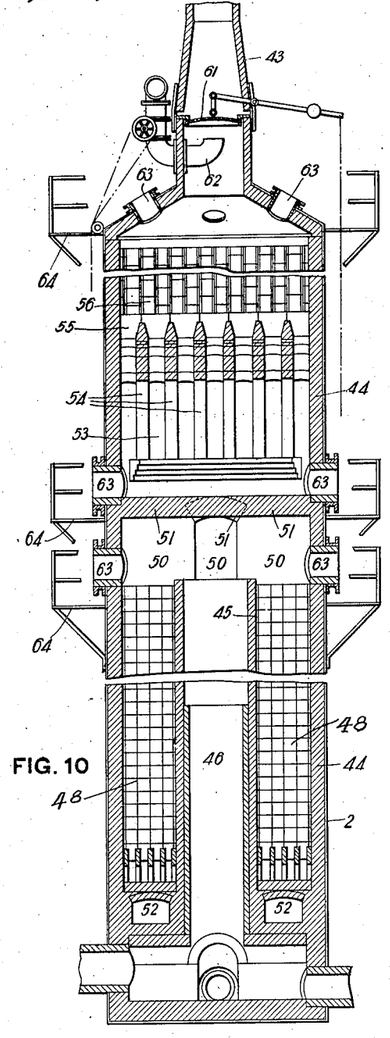
Fig. 10 is a sectional elevation showing a three-pass stove as constructed and arranged in accordance with the invention, the section being taken on the line X—X of Fig. 16.
Figure 11:
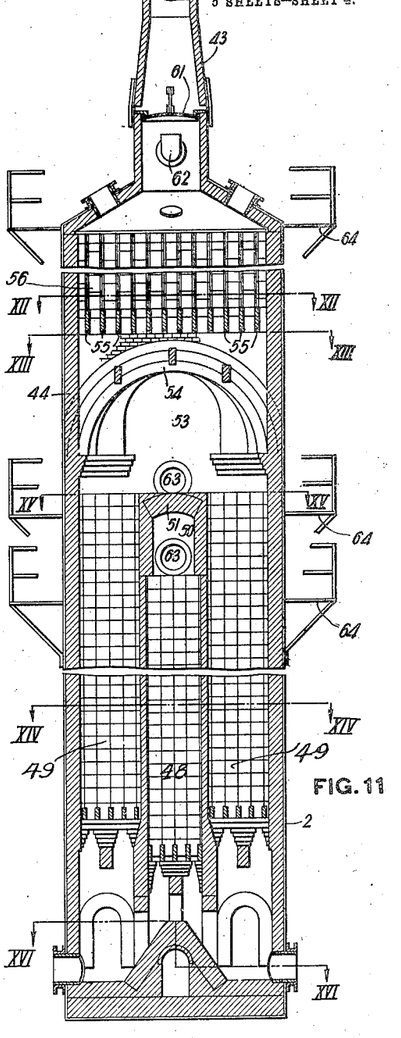
Fig. 11 is a sectional elevation of the same on the line XI—XI of Fig. 16.
Figure 12:
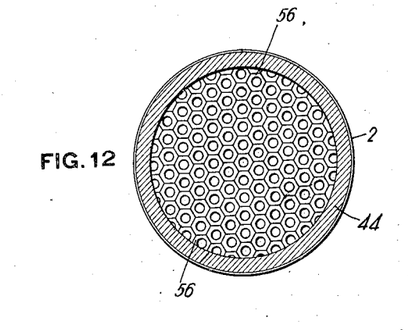
Fig. 12 is a sectional plan taken on the line XII—XII of Fig. 11.
Figure 13:
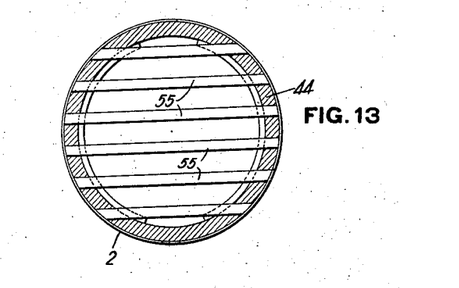
Figs. 13, 14, 15 are similar sectional plans taken respectively on the lines XIII—XIII, XIV—XIV and XV—XV of Fig. 11.
Figure 14:
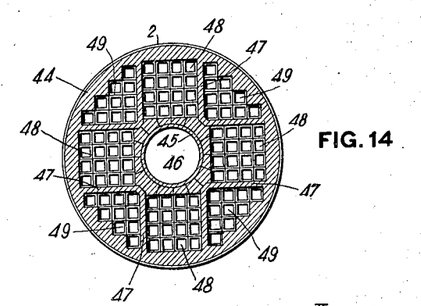
Figure 15:
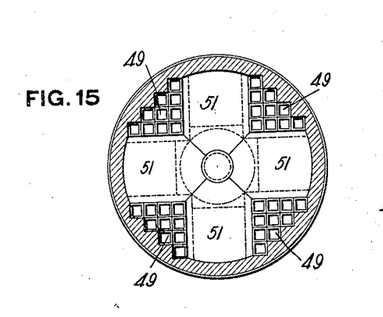
Figure 16:
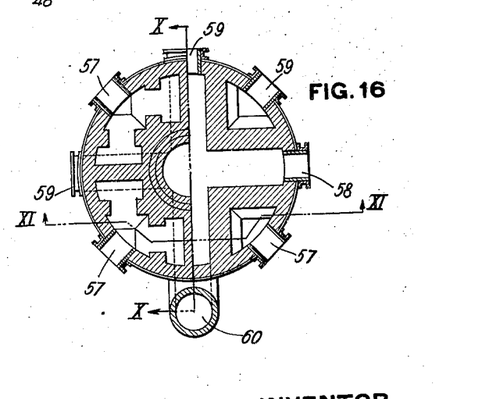
Fig. 16 is a sectional plan taken on the irregular line XVI—XVI of Fig. 11.

In the drawings, referring to Figs. 1, 2 and 3, the numeral 2 designates the usual metal hot-blast stove shell having a metal bottom 3 and metal dome-shaped top 4. The stove is of very considerable height compared to its diameter, and has a much greater ratio of height to diameter than has been the usual practice heretofore in constructing hot-blast stoves, such construction being made practicable by carrying or supporting the upper portion 5 of the checkerwork independently of the lower portion 6 thereof. The stove is provided on its top with a cleaning opening 7 and at the bottom of the stove is equipped with the usual cleaning openings 8, 8, hot-blast outlet opening 9, gas inlet opening 10 and air inlet openings 11, and air outlet or relief opening 11<sup>a</sup>. The stove has a cylindrical wall 12 forming a central combustion chamber 13 which extends from the bottom to the hemispherical open space 14 at the top of the stove, and is also provided with a refractory lining 15 within the metal shell 2, which is arranged to support the dome-shaped lining 16 for the top 4. The wall 12 forming the combustion chamber 13 and the surrounding wall 15 form an annular space therebetween, on which the checkerwork is erected, and as shown in Figs. 1, 2 and 3, this checkerwork is formed of hollow refractory blocks 17 which are trapezoidal in cross section. Owing to the very material increase in the height of the stove (from twenty-five to fifty per cent. or more) the total weight of the checkerwork is greatly increased so that if carried or supported in the usual manner the load on the lower horizontal rows of checkers would with the ordinary construction approach or equal the crushing strength of the checkers. In order to more uniformly distribute the weight and thereby lessen and prevent deterioration caused by expansion and contraction of the checkerwork, as is constantly occurring in the operation of the stove, in this improved stove construction the upper half 5 of the checkerwork is carried upon girder tiles 18 which in turn are supported upon arches 19. The arches 19 spring from and are supported by the side wall 15 and the wall 12 forming the central combustion chamber 13. The hollow blocks 17 forming the checkerwork in the bottom half 6 of the stove are supported on similarly constructed and arranged girder tiles 18 which are carried by arches 19 these arches also in this case springing from the bottom of the lining 15 and the wall 12 for the combustion chamber 13, as has been described. In this way the greatest load put upon the checkers is lessened instead of increased and a hollow chamber 20 is provided at an intermediate point in the height of the stove which connects with the vertical passages in the upper and lower portions 5 and 6 of the checkerwork, this chamber acting to equalize the flow of air and also of the products of combustion through the stove checkerwork. A platform or gallery 21 is provided around the top of the stove and also at an intermediate point in its height to facilitate cleaning of the stove and the handling of the refractories in lining and repairing the stoves. By reference to Fig. 2 it will be seen that the series of arches 19 are arranged radially around the vertical center of the stove and that the girder tiles 18 resting upon the arches 19 are arranged in a series of concentric rows about the vertical center of the stove. Short tiles 22 are placed between the rows of tiles 18 to serve as separators or spreaders which prevent lateral displacement of the tiles 18 in the expansive movement thereof.

In the stove construction shown by Figs. 4 to 9 the metal shell 2 of the stove is provided with a metal bottom 3 and dome-shaped metal top 4 in the same manner as has been described in connection with the stove of Figs. 1, 2 and 3, and in this construction at the top and at an intermediate point in its height the stove is provided with a gallery or platform 21. In addition to the cleaning opening 7 there is a cleaning opening 28 for the combustion chamber 7ª, which in this construction is located on one side of the vertical center of the stove, instead of being centrally positioned, as in the stove of Figs. 1, 2 and 3. The combustion chamber 24 in this construction is formed by the wall 25 which is curved on one face and which extends across the stove to separate the combustion chamber 24 from the checkerwork chamber, (see Figs. 6, 7 and 8) and the stove, adjacent to its lower end and within the chamber for the checkerwork, is provided with cleaning openings 26, 26, an outlet opening 27 to the chimney, and a cold-blast inlet 28. The bottom of the combustion chamber 24 is provided with a gas inlet opening 29, hot-blast outlet 30, an air relief opening 31, cleaning opening 32 and gas inlet 33. As in the preceding figures the checkerwork extends from the bottom to the top of the stove and at an intermediate point in the height of the stove the upper portion 5 of the checkerwork is supported on girder tiles 34 which in turn are carried by a series of parallel arches 35, these arches being supported on the stove lining 36 and extending across the stove in lines parallel with a horizontal line through the vertical center of the stove, as is clearly shown in Figs. 4 and 5. The stove has the chamber 20 connecting upper and lower portions 5 and 6 of the checkerwork and the lining 36 is racked out to form shelves 37 on which the ends of the upper series of arches 35 rest. The bottom portion 6 of the checkerwork 33 is carried upon girder tiles 34 and parallel arches 35 in the same manner as the upper portion 5, and tiles 38 and 39 forming spreaders are positioned between the parallel arches 35 and the girder tiles 34 to prevent sidewise displacement thereof during the expansion and contraction which is constantly occurring in the checkerwork when the stove is in use. A series of cleaning openings 40 is provided at an intermediate point in the height of the stove to afford entrance to the open space 20 on the interior of the stoves at a point adjacent to the arches 35 carrying the upper portion 5 of the checkerwork.

In the construction of Figs. 4 to 9, hollow blocks or checkers 41 are employed which are polygonal in cross section and have a central opening 42 therethrough and which are arranged in a series of parallel rows, with the opening 42 in the checkers of each course or horizontal row registering with the openings of the checkers in the row immediately above and below so as to form the checkerwork with a plurality of vertically extending parallel passages therein.

In the construction shown in Figs. 10 to 16, in which a three-pass stove is illustrated, the metal shell 2 of the stove is provided with a chimney or stack 43 on its top instead of having an outlet on its bottom leading to the chimney as in the preceding figures. The stove is provided with a refractory lining 44 and in the lower portion of the stove with a cylindrical wall 45 forming a vertical combustion chamber 46 which extends from the bottom to an intermediate point in the height of the stove. Within the space between the shell lining 44 and cylindrical wall 45 are the partition walls 47 which are tied into the lining 44 and wall 45 so as to form eight separate lengthwise vertical passages 48, 49, (see Fig. 14). Above the top of the vertical combustion chamber, which terminates at about the middle of the height of the stove, is an open space formed by the series of four channels 50 which connects the vertical combustion chamber 46 with the checkerwork below the transverse partition walls or arches 51 separating the lower portion of the stove into the four downward passages 48 (see Fig. 14). The bottom of these downward passages 48 are connected by the transverse passages 52 with the series of four upward passages 49 (see Fig. 10) which open into the open space 53 above the arches 51 forming the top of the channels 50 connecting the downward passages 48 and combustion chamber 46. A series of parallel sidewise separated arches 54 are supported upon the stove lining 44 above the roof formed by the arches 51, and girder tiles 55 are supported upon the arches 54 in the same manner as in Figs. 1 to 9. Above the girder tiles 55 the stove is provided with checkerwork 56, this checkerwork being formed of hexagonal refractory blocks having a central opening therethrough similar to those shown in Figs. 4 and 6. The stove is provided with cleaning door inlets 57, which also serve as air inlets, a gas inlet 58, an air relief outlet 59 and with a hot blast outlet 60 at the bottom thereof, and the chimney 43 for the stove is provided with a chimney valve 61 and with a cold-blast inlet 62. The chimney valve and cold-blast inlet being of known construction are not further described. Cleaning door outlets 63 are provided on the top of the stove and also above and below the arches forming the top of the connecting channels 50 at the top of the vertical combustion chamber 46, and galleries or platforms 64 are provided at suitable elevations on the outside of the stove for use in lining and cleaning the stoves and the outlet openings on the stove are provided with the usual equipment of doors or covers.

The cleaning openings are all provided with removable closing doors and suitable air and gas valves and hot-blast and chimney valves are employed to shut the openings to which they are applied as required or found necessary. Such devices being old and well known and not forming part of this invention are not further described.

The invention is not only adapted for use in the construction of new stoves, but is equally applicable for use in remodeling existing stoves.

In applying the invention to existing stoves the height of the stove is increased to the desired extent, the top 4 of the stove being raised and secured in place on the top of the new portion of the stove shell 2. The arches 19, depending upon the type of stove, are then sprung from the side walls at an intermediate point in the height of the rebuilt stove and after the girder tiles 18 are secured in position the additional checkerwork 5 is put into place.

In the operation of the improved stove shown by Figs. 1, 2 and 3, when the stove is being heated or "on gas", the gas enters the bottom of the stove through the gas inlet opening 11 and air is supplied to the bottom of the stove through the air inlet opening 10. The mixture of gas and air burns within the combustion chamber 13 and the products of combustion rise through the combustion chamber into the open space 14 at the top of the stove and then pass downwardly to the bottom thereof through the series of openings in the hollow checkerwork, passing out of the stove through the stack outlet 23 leading to the chimney or stack. After the checkerwork and refractory lining become heated to the desired temperature the gas supply is shut off and the gas inlet and air inlet openings, chimney valve and other openings into the interior of the stove are then tightly closed. The cold-blast valve on the stove is then opened and the cold-blast or air, which is under considerable pressure, is admitted at the bottom of the stove through the cold-blast valve into and through the inlet 23 and, rising upwardly through the series of passages in the highly heated checkerwork, passes into the open space 14 at the top of the stove and then passes downwardly through the combustion chamber 13. The cold-blast in its passage through the checkerwork and combustion chamber 13 absorbs heat therefrom, and, upon reaching the bottom of the combustion chamber of the stove, passes out of the stove through the hot-blast outlet 9 into a hot-blast main leading to the blast-furnace, the hot-blast valve being opened when the stove is "on air".

In the operation of the stove shown in Figs. 4 to 9 when the stove is being heated on "on gas" the gas enters through the gas inlet or burner and mixes with the air entering through the air inlet in the combustion chamber 24 in which it burns. The burned gases or products of combustion rise upwardly through the combustion chamber 24 into the open space 14 at the top of the stove and then pass downwardly through the series of vertical passages in the checkerwork to the bottom of the stove and then pass out through the outlet opening 27 leading to the chimney valve. The gas is then shut off and the chimney valve closed and all openings except the cold-blast inlet 28 and hot-blast outlet 30 are tightly closed. The cold-blast valve being opened to admit the cold-blast through the inlet 28 into the bottom part of the stove, the cold-blast rises upwardly through the checkerwork and passes into the open space 14 at the top of the stove and then travels downwardly through the combustion chamber 24, becoming heated in passing through the stove and passing out through the now open hot-blast outlet 30 into the hot-blast main leading to the blast-furnace. After the cold-blast passing through the stove has cooled the checkerwork to the point where it is desirable to again heat the stove, the cold-blast and hot-blast valves are closed to prevent further passage of air therethrough. The air relief valve 31 is then opened to reduce the air confined within the stove to atmospheric pressure, the compressed air within the stove being allowed to escape through the air relief valve into the atmosphere. Gas is then again caused to burn in the stove as has been described, and the above described operations are again repeated in heating the checkerwork preparatory to again heating the stove of Figs. 4 to 9 and later heating the cold-blast.

In the operation of the improved three-pass stove shown in Figs. 10 to 16, when the stove is being heated or "on gas" the chimney valve 61 is open and the cold blast valve on the cold blast inlet 62 at the top of the stove and hot blast valve on the hot blast outlet 59 at the base of the stove are closed. The air inlet openings 57 and gas inlet openings 58 are opened to admit gas and air to the central combustion chamber 46. The mixture of gas and air burns in the combustion chamber and after rising to the channels 50 at the top thereof pass downwardly through the vertical passages 48 in the checkerwork to the bottom of the stove and then pass through the thensverse openings 52 into the passages 49 in the checkerwork. The burned gases then rise in the passages 49 and emerge into the open space 53 below the upper section of the checkerwork and rising through the openings in the checkerwork 56 pass into and out of the chimney 43 on top of the stove. After the checkerwork becomes heated to the desired extent the gas is shut off and the gas inlet 58 and air inlets are closed. The chimney valve 61 is then closed and the cold-blast valve on the cold-blast inlet 62 and hot-blast valve on the hot-blast outlet 60 are opened. The cold-blast entering the top of the stove then passes downwardly through the checker-work 56 in the upper section of the stove into the open space 53 and then passes downwardly through the vertical passages 49 in the lower section of the checkerwork into the transverse passages 52 and then upwardly through the passages 48 into the open space 5 at the top of the combustion chamber. The air then passes downwardly through the combustion chamber 46 and through the hot-blast outlet 60 into the hot-blast main leading to the furnace bustle-pipe. After the passage of cold-blast through the stove has cooled the checkerwork so as to require that it be again heated, the cold-blast valve and the hot-blast valve are again closed and the air relief outlet 59 is opened to release the air in the stove and reduce the pressure therein, this air being allowed to escape into the atmosphere. When the interior of the stove is reduced to atmospheric pressure the gas is again turned on after the chimney valve has been again opened and the above described operations are then again repeated.

On account of the very great height of the improved stove a given volume of air is brought into contact with a greater amount of heating surface or heated refractory material during its passage through the stove so that the time interval in which the air is maintained in contact with the highly heated surface of the checkerwork is practically doubled without material decrease in the pressure and velocity of the hot-blast passing through the stove, in this way greatly increasing the capacity and efficiency of the stove.

The advantages of the invention will be apparent to those skilled in the art. The capacity and efficiency of the hot-blast stoves is very materially increased at a relatively small increase in cost. Another advantage of the invention arises from the construction whereby the separate top and bottom portions of the checkerwork are independently supported so that in case the bottom portion should require renewal or repairs, such portion can be removed and replaced without disturbing the upper separately supported portion of the checkerwork.

Modifications in the construction and arrangement of the parts may be made without departing from the invention. The invention may be applied to two and to three-pass stoves of other types than the two-pass and three-pass stoves shown, and other changes may be made within the scope of the appended claims.

Claims:—

1. A hot-blast stove comprising a metal shell, a refractory lining in said shell, a refractory checkerwork within the lining, said checkerwork being formed in horizontally separate and independently supported sections, and a vertical combustion chamber in the stove extending from the bottom to the top of said checkerwork and communicating therewith at the top of the stove.

2. A hot-blast stove comprising a metal shell, a refractory lining in said shell, a refractory checkerwork within the lining, said checkerwork being formed in at least two horizontally separate and independently supported sections, and a vertical combustion chamber in the stove extending from the bottom to the top of said checkerwork and communicating therewith at the top of the stove.

3. A hot-blast stove comprising a metal shell, a refractory lining in said shell, a refractory checkerwork within the lining, said checkerwork being formed in horizontally separate and independently supported sections, a vertical combustion chamber in the stove extending from the bottom to the top of said checkerwork and communicating therewith at the top of the stove, and a plurality of separate and independent arches supporting each section of the checkerwork.

4. A hot-blast stove comprising a metal shell, a refractory lining in said shell and checkerwork formed of refractory blocks within the lining, said checkerwork being formed in at least two horizontally separate and independently supported sections, a vertical combustion chamber in the stove extending from the bottom to the top of said checkerwork and communicating therewith at the top of the stove, and a plurality of separate and independent arches supporting each section of the checkerwork.

5. A hot-blast stove comprising a metal shell, a refractory lining in said shell and checkerwork formed of refractory blocks within the lining, said checkerwork being formed in horizontally separate and independently supported sections, a vertical combustion chamber in the stove extending from the bottom to the top of said checkerwork and communicating therewith at the top of the stove, a series of rows of girder tiles supporting each section of said checkerwork, and a plurality of separate and independent arches supporting the tiles carrying each section of the checkerwork.

6. A hot-blast stove comprising a metal shell, a refractory lining in said shell and checkerwork formed of refractory blocks within the lining, said checkerwork being formed in at least two horizontally separate and independently supported sections, a vertical combustion chamber in the stove extending from the bottom to the top of said checkerwork and communicating therewith at the top of the stove, a series of rows of girder tiles supporting each section of said checkerwork, and a plurality of separate and independent arches supporting the tiles carrying each section of the checkerwork.

7. A hot-blast stove comprising a metal shell, a refractory lining in said shell, said checkerwork being formed in horizontally separate and independently supported sections, and a vertical combustion chamber in the stove extending upwardly from the bottom of the stove.

In testimony whereof, I have hereunto set my hand.

NELLIE E. SMITH,
*Administrator of the estate of George H. Smith.*

Witnesses:
L. E. RIDDLE,
L. P. CAMPBELL.